United States Patent
Suzuki et al.

(10) Patent No.: US 9,150,195 B2
(45) Date of Patent: Oct. 6, 2015

(54) POSITION DETECTION SYSTEM AND POSITION DETERMINATION METHOD

(75) Inventors: Takayuki Suzuki, Aichi (JP); Hidemitsu Kawashima, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 370 days.

(21) Appl. No.: 13/593,631

(22) Filed: Aug. 24, 2012

(65) Prior Publication Data

US 2013/0054095 A1    Feb. 28, 2013

(30) Foreign Application Priority Data

Aug. 25, 2011    (JP) .................. 2011-184181

(51) Int. Cl.
B60R 25/24    (2013.01)
B60C 19/00    (2006.01)
B60N 2/00    (2006.01)

(52) U.S. Cl.
CPC .................. B60R 25/245 (2013.01)

(58) Field of Classification Search
CPC ...... B60C 11/24; B60C 19/00; B60R 25/245; B60N 2/002
See application file for complete search history.

(56) References Cited

U.S. PATENT DOCUMENTS

| | | | |
|---|---|---|---|
| 6,629,032 B2 | 9/2003 | Akiyama | |
| 6,922,545 B2 | 7/2005 | Nakatsugawa | |
| 7,305,284 B2 | 12/2007 | Teshima et al. | |
| 7,444,117 B2 | 10/2008 | Katayama et al. | |
| 2001/0014585 A1 | 8/2001 | Nakatsugawa | |
| 2003/0018422 A1 | 1/2003 | Akiyama | |
| 2003/0043793 A1 | 3/2003 | Reinold et al. | |
| 2004/0097263 A1 | 5/2004 | Katayama et al. | |
| 2005/0031344 A1 | 2/2005 | Sato et al. | |
| 2006/0030268 A1 | 2/2006 | Teshima et al. | |

(Continued)

FOREIGN PATENT DOCUMENTS

| | | |
|---|---|---|
| DE | 10342581 A1 | 4/2004 |
| EP | 1384626 A1 | 1/2004 |

(Continued)

OTHER PUBLICATIONS

Office Action for German Application No. 10 2012 106 1254 dated Nov. 8, 2012, with English translation thereof (13 pages).

(Continued)

*Primary Examiner* — Calvin Cheung
*Assistant Examiner* — Basil T Jos
(74) *Attorney, Agent, or Firm* — Osha Liang LLP (57) ABSTRACT

A radio-wave-transmitting-body position detection system in a vehicle system has a plurality of electronic control devices that are included in a vehicle, and a radio wave transmitting body that transmits a radio signal to the plurality of electronic control devices. The electronic control devices conduct communication with each other using the radio signal. Each electronic control device includes a first electronic control device that conducts communication with the other electronic control device and the radio wave transmitting body using the radio signal, and controls a device included in the vehicle based on a content of the radio signal transmitted from the radio wave transmitting body. The electronic control devices except the first electronic control device include a first transmitting/receiving unit that transmits and receives the radio signal.

1 Claim, 7 Drawing Sheets

(56) References Cited

U.S. PATENT DOCUMENTS

| | | |
|---|---|---|
| 2008/0262662 A1 | 10/2008 | Higashi |
| 2009/0031767 A1 | 2/2009 | Ko et al. |
| 2009/0091185 A1 | 4/2009 | Konno |
| 2011/0208413 A1 | 8/2011 | Ko et al. |
| 2012/0089299 A1* | 4/2012 | Breed .............................. 701/36 |

FOREIGN PATENT DOCUMENTS

| | | |
|---|---|---|
| JP | 2003101557 A | 4/2003 |
| JP | 2003-152737 A | 5/2003 |
| JP | 2006045908 A | 2/2006 |
| JP | 2009-084929 A | 4/2009 |
| JP | 2009-167638 A | 7/2009 |

OTHER PUBLICATIONS

Office Action Issued in U.S. Appl. No. 13/543,490, Dated Apr. 11, 2013 (19 Pages).

Patent Abstract of JP 2009-167638, Keyless Entry System for Vehicle, Publication Date: Jul. 3, 2009 (1 Page).

Patent Abstract of JP 2003-152737, "Vehicle Control System, and Wireless Relaying", Publication Date: May 23, 2003 (1 Page).

* cited by examiner

POSITION DETECTION SYSTEM AND POSITION DETERMINATION METHOD

TECHNICAL FIELD

The present invention relates to a position detection system and a position determination method, particularly to a position detection system and a position determination method in a vehicle control system including a plurality of electronic control devices that are provided in a vehicle and a portable device that transmits information using a radio signal.

RELATED ART

Nowadays, a vehicle is controlled by many electronic control devices (hereinafter also referred to as "ECUs") including engine control, such as a fuel injection amount, vehicle driving control, such as a transmission, braking control, such as an ABS (Antilock Brake System), and vehicle-body control, such as a door, a power window, and an air-bag. Communication between the ECUs and sharing of information are required to properly control each unit of the vehicle, and the ECUs are connected to each other through a network to construct an in-vehicle network system.

However, the ECUs are disposed in many places in the vehicle, and the number of wire harnesses, such as an electric power line connecting a battery and each ECU and a communication line (such as a CAN and a LIN) connecting the ECUs, is increased to enlarge a wiring space, which may result in difficulty in performing wiring in the vehicle. An increase in weight of the wire harness may also occur. Therefore, there is well known a configuration in which information is exchanged between the ECUs in the vehicle without wiring the communication line.

For example, Japanese Unexamined Patent Publication No. 2003-101557 discloses a vehicle communication system in order to transmit and receive the information among various electric devices mounted on the vehicle without wiring many communication lines for various networks in the vehicle. In the vehicle communication system including one or a plurality of transmitting/receiving circuits, a transmitting/receiving unit that can transmit and receive various pieces of information through the power supply line is provided in each ECU mounted on the vehicle, and each transmitting/receiving unit can conduct multiple communication in each type of the information to be transmitted and received between the ECUs using different transmission frequencies.

Japanese Unexamined Patent Publication No. 2003-152737 discloses a vehicle control system in order to be able to securely conduct radio communication between a plurality of electronic control devices without wiring a cable. In the vehicle control system, three ECUs are mounted in each area where the direct communication can wirelessly be conducted, three repeater devices are arrayed on a center line of the vehicle such that the radio communication can be conducted between the areas, and the repeater devices pass the information with a set transmission level.

Conventionally, there is well known a keyless entry system or a passive entry system, in which a lock/unlock state of the door is controlled by bidirectional communication between a portable device (FOB) carried by a user and the ECU mounted on the vehicle. There is also well known an in-vehicle device remote control system that gives permission for the ignition of the engine.

For example, Japanese Unexamined Patent Publication No. 2006-45908 discloses an in-vehicle device remote control system in order that a desirable sensing area is always ensured even if the sensing area that is an access range of a request signal transmitted from a transmitter in a vehicle interior varies in each vehicle or changes according to a radio wave environment in which the vehicle is placed. The in-vehicle device remote control system is installed in an outer edge position of a desirable vehicle-interior sensing area, includes a reference LF receiver that receives a signal transmitted from a vehicle-interior LF transmitter, and adjusts a signal transmission output level of the vehicle-interior LF transmitter based on a reception result of the reference LF receiver.

Japanese Unexamined Patent Publication No. 2009-167638 discloses a keyless entry system of the vehicle that locks/unlocks a desired door of the user using a radio portable key with less amount of operation. In the keyless entry system, a plurality of receivers are installed near the door of the vehicle, the door that is an operation target through which the user gets on or out the vehicle is determined by a position of the receiver that receives the strongest radio wave, and only the door is locked/unlocked.

However, in the related art, in order to accurately detect the position of the FOB, it is necessary to dispose the receiver and the antenna in each position of the vehicle, and therefore it is necessary to install the wiring between the receiver and the antenna and the ECU, which results in wiring space being enlarged to increase a wire harness weight.

SUMMARY

One or more embodiments of the present invention provides a position detection system and a position determination method, which accurately detect the position of the portable device (FOB) without providing many dedicated antennae that transmit and receive information using the radio signal in the electronic control device that controls the device of the vehicle, in the vehicle control system in which the vehicle includes the plurality of electronic control devices (ECU).

In accordance with one or more embodiments of the present invention, a radio-wave-transmitting-body position detection system in a vehicle system including a plurality of electronic control devices that are included in a vehicle, and a radio wave transmitting body that transmits a radio signal to the plurality of electronic control devices, the electronic control devices conducting communication with each other using the radio signal, wherein each electronic control device includes a first electronic control device that conducts communication with the other electronic control device and the radio wave transmitting body using the radio signal, and controls a device included in the vehicle based on a content of the radio signal transmitted from the radio wave transmitting body, the electronic control devices except the first electronic control device include: a first transmitting/receiving unit that transmits and receives the radio signal; a first signal intensity detector that detects signal intensity of the radio signal, which is transmitted from the radio wave transmitting body and received by the first transmitting/receiving unit; and an information transmitting unit that transmits information on the signal intensity, which is detected by the first signal intensity detector, from the first transmitting/receiving unit to the first electronic control device, and the first electronic control device includes: a storage in which disposition information on a disposition position of each electronic control devices in the vehicle is stored; a second transmitting/receiving unit that transmits and receives the radio signal; a specifying unit that determines whether the radio signal received by the second transmitting/receiving unit is the radio signal transmitted from the radio wave transmitting body or the radio signal transmitted from the other electronic control device, acquires the signal intensity information to specify the electronic control device, which transmits the signal intensity information, when the radio signal received by the second transmitting/receiving unit is the radio signal transmitted from the other electronic control device while the signal intensity information transmitted from the information transmitting unit is included in the radio signal; a second signal intensity detector that detects the signal intensity of the radio signal transmitted from the radio wave transmitting body when the specifying unit determines that the radio signal received by the second transmitting/receiving unit is the radio signal transmitted from the radio wave transmitting body; and a determination unit that determines a position of the radio wave transmitting body based on the signal intensity information detected by the second signal intensity detector, the signal intensity information acquired by the specifying unit, and the disposition information, which corresponds to the specified first electronic control device and stored in the storage.

Therefore, in the vehicle control system in which the vehicle includes the plurality of electronic control devices, the position detection system that uses the other electronic control device to accurately detect the position of the radio wave transmitting body without providing many dedicated antennae can be provided.

In accordance with one or more embodiments of the present invention, a method for determining a position of a radio wave transmitting body that transmits information controlling a device of a vehicle to a plurality of electronic control devices using a radio signal in the vehicle including the electronic control devices that conduct radio communication with each other, wherein a first electronic control device in each electronic control device detects signal intensity of the radio signal transmitted from the radio wave transmitting body and transmits the signal intensity information to a second electronic control device of each electronic control device, and the second electronic control device determines a position of the radio wave transmitting body based on the signal intensity information transmitted from the first electronic control device, and/or information on the signal intensity of the radio signal transmitted from the radio wave transmitting body, which is detected by the second electronic control device, and disposition information on a disposition position of each electronic control device in the vehicle.

Therefore, in the vehicle including the plurality of electronic control devices that conduct radio communication with each other, the method for accurately determining the position of the radio wave transmitting body using the other electronic control device can be provided.

As described above, according to one or more embodiments of the invention, a position detection system and a position determination method, which accurately detect the position of the radio wave transmitting body without providing many dedicated antennae that transmit and receive the information using the radio signal in the electronic control device that controls the device of the vehicle, can be provided in the vehicle control system in which the vehicle includes the plurality of electronic control devices. As a result, the position of the radio wave transmitting body can accurately be determined without separately providing the antenna that transmits and receives the information using the radio signal. Additionally it is not necessary to dispose the wire harness between the electronic control devices in order to transmit and receive the information. Therefore, there is a margin in a space of the vehicle, and weight reduction is also achieved.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
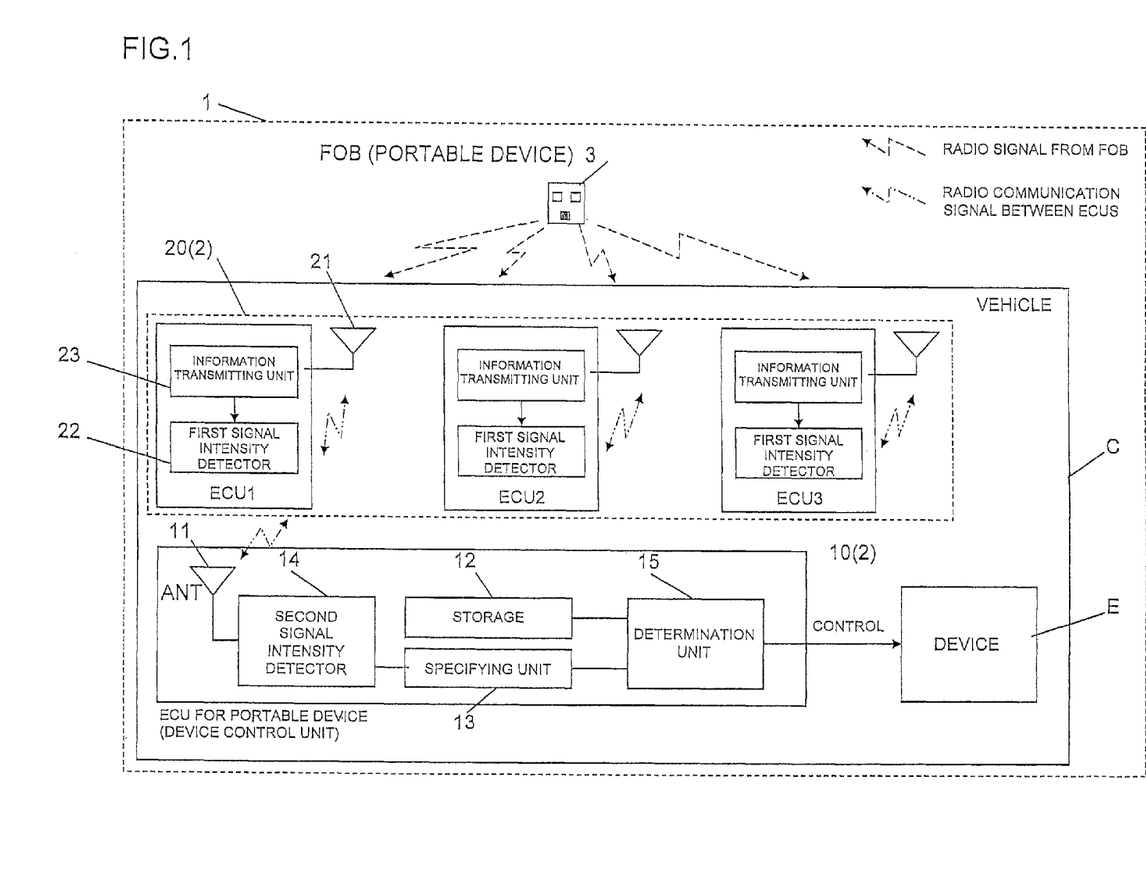
FIG. 1 is a block diagram illustrating a vehicle control system according to one or more embodiments of the invention.

FIG. 1 is a block diagram illustrating a position detection system 1 according to one or more embodiments of the invention. The position detection system 1 includes an electronic control device 2 that is provided in a vehicle C and a portable device 3 (also referred to as an FOB) that is the radio wave transmitting body, which transmits information using a radio signal. The portable device 3 is not limited to a product possessed by a user of the vehicle. For example, the portable device 3 may be a communicator mounted on the other vehicle or a communicator set up in a facility, such as a building. In the following description, the radio wave transmitting body includes a general communicator that controls the vehicle by conducting radio communication with an in-vehicle electronic control device.

The vehicle C includes the plurality of electronic control devices 2, and some of or all the electronic control devices 2 have a communication function of conducting radio communication with the other electronic control device 2 except the own electronic control device 2 and the portable device 3 (radio wave transmitting body 3). The electronic control devices 2 conduct communication with each other using the radio signal to constitute one vehicle system. The electronic control device 2 having the communication function includes a first electronic control device 10 (in FIG. 1, ECU for portable device) and a second electronic control device 20. The first electronic control device 10 controls a device E that is a control target mounted on the vehicle C. Although the second electronic control device 20 does not directly control the device E, the second electronic control device 20 passes the radio signal including control information, which is transmitted from the portable device 3, to the first electronic control device 10. The first electronic control device 10 conducts communication with the other electronic control device 2 and radio wave transmitting body 3 using the radio signal, and controls the device E based on a content of a signal transmitted from the radio wave transmitting body 3.

The information transmitted from the portable device 3 is information controlling the device E, for example, lock/unlock control information in the case in which the device E is the vehicle door, and engine start/stop control information in the case in which the device E is the engine. In the case in which the radio wave transmitting body is the communicator mounted on the other vehicle, for example, the information transmitted from the radio wave transmitting body is data that is exchanged between the vehicles or control information processing the data. In the case in which the radio wave transmitting body is the communicator set up in the facility, such as the building, the information transmitted from the radio wave transmitting body is data or a program, which is used in the electronic control device of the vehicle.

The second electronic control device 20 is the electronic control device except the first electronic control device 10. The second electronic control device 20 includes a first transmitting/receiving unit 21 that transmits and receives the radio signal, a first signal intensity detector 22 that detects signal intensity of the radio signal, which is transmitted from the radio wave transmitting body 3 and received by the first transmitting/receiving unit 21, and an information transmitting unit 23 that transmits the information on the signal intensity, which is detected by the first signal intensity detector 22, from the first transmitting/receiving unit 21 to the first electronic control device 10. In one or more embodiments of the present invention, the vehicle C includes the three second electronic control devices 20. However, there is no particular limitation to the number of second electronic control devices 20 included in the vehicle C.

Typically the first transmitting/receiving unit 21 is an antenna. The first transmitting/receiving unit 21 transmits and receives the radio signal to and from the portable device 3 and the other electronic control device 2 having the communication function. The first transmitting/receiving unit 21 may be used only to transmit and receive the radio signal to and from the portable device 3 that is the radio wave transmitting body, or may conduct communication with the communicator that is the other radio wave transmitting body. One first transmitting/receiving unit 21 is provided in one second electronic control device 20. Alternatively, a plurality of first transmitting/receiving units 21 may be provided in order to improve the sensitivity of the transmission and reception. As to a usable bandwidth, generally an RF band is used from the portable device 3 to the first transmitting/receiving unit 21 and an LF band is used from the first transmitting/receiving unit 21 to the portable device 3 and the other electronic control device 2. However, there is no particular limitation to the usable bandwidth.

The first signal intensity detector 22 detects the signal intensity of the radio signal, which is transmitted from the portable device 3 and received by the first transmitting/receiving unit 21. For example, in the radio signal that is generated by the portable device 3 operated by a user, the intensity of the received radio signal depends on a distance between the portable device 3 and the first transmitting/receiving unit 21 that receives the radio signal. The first signal intensity detector 22 performs the detection by measuring signal intensity (RSSI: Received Signal Strength Indication).

The information transmitting unit 23 transmits the information on the signal intensity, which is detected by the first signal intensity detector 22, from the first transmitting/receiving unit 21 to the first electronic control device 10. The information on the signal intensity is one in which the signal intensity is digitized or ranked in some form. For example, the information on the signal intensity may be an own value of the RSSI or a value in which the value of the RSSI is ranked into five stages of an A rank to an E rank.

The first electronic control device 10 includes a second transmitting/receiving unit 11, a storage 12, a specifying unit 13, a second signal intensity detector 14, and a determination unit 15. In one or more embodiments of the invention, the vehicle C includes one first electronic control device 10. Alternatively, a plurality of first electronic control devices 10 may be provided in one device E, or one or a plurality of first electronic control devices 10 may be provided in another device E' (not illustrated).

Typically the second transmitting/receiving unit 11 is an antenna. The second transmitting/receiving unit 11 transmits and receives the radio signal to and from the portable device 3 and the other electronic control device 2, such as the second electronic control device 20. The second transmitting/receiving unit 11 may be used only to transmit and receive the radio signal to and from the portable device 3 that is the radio wave transmitting body, or may conduct communication with the communicator that is the other radio wave transmitting body. One second transmitting/receiving unit 11 is provided in one first electronic control device 10. Alternatively, a plurality of second transmitting/receiving units 11 may be provided in order to improve the sensitivity of the transmission and reception. As to the usable bandwidth, generally the RF band is used from the portable device 3 to the second transmitting/receiving unit 11 and the LF band is used from the second transmitting/receiving unit 11 to the portable device 3 and the other electronic control device 2. However, there is no particular limitation to the usable bandwidth.

Typically the storage 12 is constructed by a memory. Information on a disposition position of each of the electronic control devices 2 in the vehicle C and identification information on each of the portable device 3 and the electronic control device 2 are stored in the storage 12. More specifically, the identification information (device ID or a frequency of the radio signal generated by each of the portable device 3 and the electronic control device 2) on each of the electronic control devices 2 in the vehicle C and the disposition position corresponding to the electronic control device 2 are stored in the storage 12 while correlated with each other. The disposition position means a position in the vehicle, such as a right front door, a left rear door, a front bumper, and a rear trunk. Accordingly, the disposition of an ECU 1 in the right front door and the disposition of an ECU 2 in the rear trunk are stored in the storage 12. Usually the information is stored in the storage 12 in shipping or maintenance of the vehicle C.

The specifying unit 13 identifies whether the radio signal received by the second transmitting/receiving unit 11 is the signal transmitted from the portable device 3 or the signal transmitted from the other electronic control device 2. In the case in which the radio signal is the signal transmitted from the other electronic control device 2, when the radio signal includes the information on the signal intensity from the information transmitting unit 23, the specifying unit 13 acquires the information on the signal intensity, and specifies the electronic control device 2 that transmits the information on the signal intensity.

More specifically, the specifying unit 13 takes out the identification information from the radio signal received by the second transmitting/receiving unit 11, and identifies the received radio signal as the radio signal transmitted from the other electronic control device 2 when the identification information is matched with the identification information on the other electronic control device 2 stored in the storage 12. The specifying unit 13 also takes out the information on the signal intensity from the received radio signal, and specifies which electronic control device 2 in the vehicle is the electronic control device that transmits the information on the signal intensity when effective information is included as the signal intensity.

The second signal intensity detector 14 detects the signal intensity of the radio signal transmitted from the portable device 3 when the specifying unit 13 identifies the signal received by the second transmitting/receiving unit 11 as the signal transmitted from the portable device 3. More specifically, the specifying unit 13 takes out the identification information from the radio signal received by the second transmitting/receiving unit 11, and identifies the received radio signal as the signal transmitted from the portable device 3 when the identification information is matched with the identification information on the portable device 3, which is stored in the storage 12. The second signal intensity detector 14 detects the signal intensity of the radio signal, which is received by the second transmitting/receiving unit 11 and transmitted from the portable device 3. For example, in the radio signal that is generated by the portable device 3 operated by the user, the intensity of the received radio signal depends on a distance between the portable device 3 and the second transmitting/receiving unit 11 that receives the radio signal. The second signal intensity detector 14 performs the detection by measuring the signal intensity (RSSI).

The determination unit 15 determines a position of the portable device 3 based on the signal intensity information detected by the second signal intensity detector 14, the signal intensity information acquired by the specifying unit 13, and the disposition information, which corresponds to the specified first electronic control device and is stored in the storage 12. The description will more specifically be made below.

Figure 3:
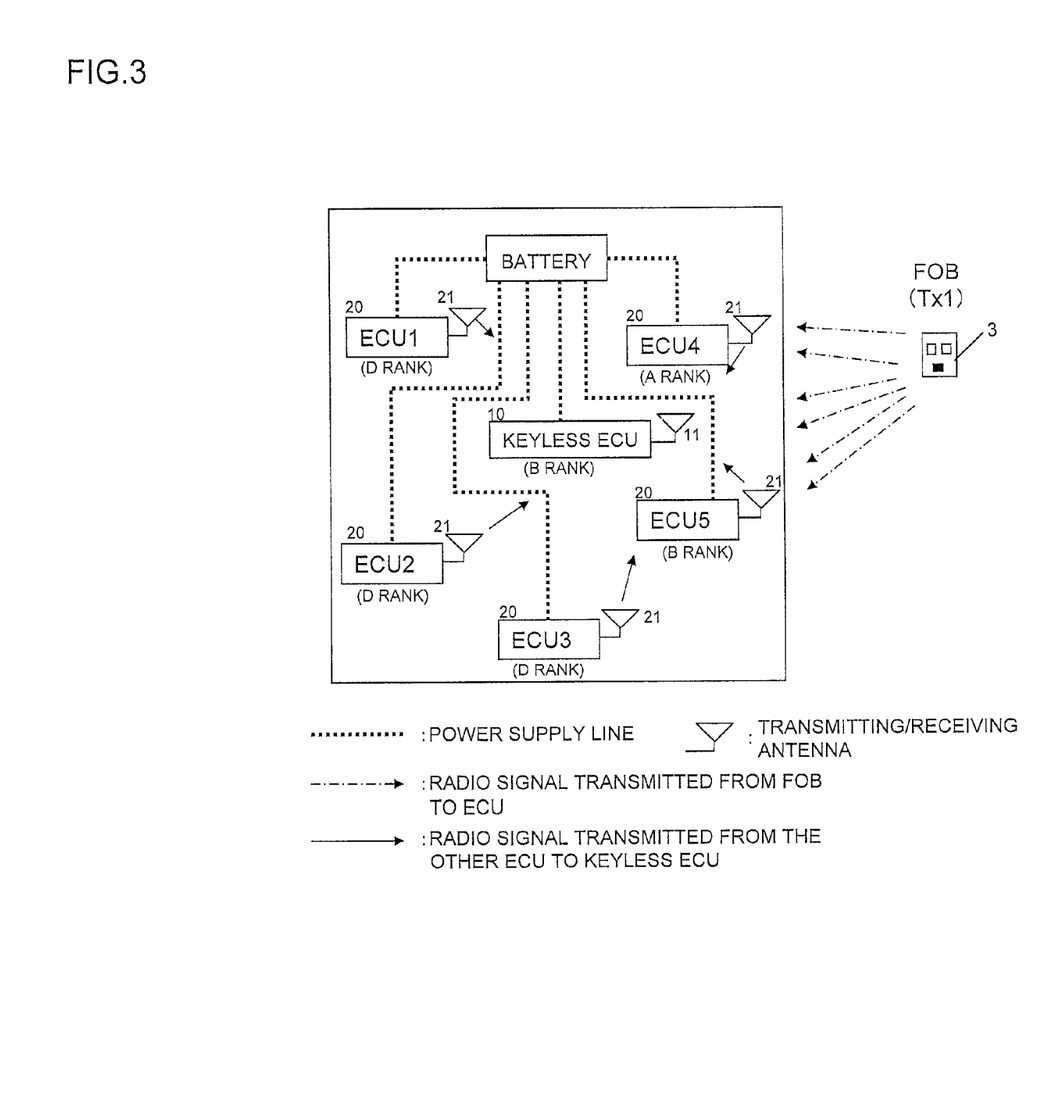
FIG. 3 is a block diagram illustrating a detailed vehicle control system according to one or more embodiments of the invention.

It is assumed that the ECU 1 in FIG. 3 is disposed near a left front door, that the ECU 2 is disposed near the left rear door, that an ECU 3 is disposed near the rear trunk, that an ECU 4 is disposed near the right front door, that an ECU 5 is disposed near a right rear door, and that the ECU for portable device is disposed near a central portion of a vehicle body. Accordingly, the identification information on each electronic control devices 2 and the disposition position of each electronic control device 2 are stored in the storage 12 while correlated with each other. It is assumed that the radio signal generated by the portable device 3 is received by all the electronic control devices 2.

In the ECU 1, the first signal intensity detector 22 detects the signal intensity of the radio signal, which is received by the first transmitting/receiving unit 21 and transmitted from the portable device 3. It is assumed that the information transmitting unit 23 of the ECU 1 ranks the signal intensity information detected by the first signal intensity detector 22 into four ranks of an A rank to a D rank and transmits the signal intensity information from the first transmitting/receiving unit 21 to the first electronic control device 10. At this point, the signal intensity is significantly strong in the A rank, the signal intensity is strong in the B rank, the signal intensity is weak in the C rank, and the signal intensity is significantly weak in the D rank.

It is assumed that the first signal intensity detector 22 of the ECU 1 transmits the signal intensity information in the D rank to the first electronic control device 10, that the first signal intensity detector 22 of the ECU 2 transmits the signal intensity information in the D rank to the first electronic control device 10, that the first signal intensity detector 22 of the ECU 3 transmits the signal intensity information in the D rank to the first electronic control device 10, that the first signal intensity detector 22 of the ECU 4 transmits the signal intensity information in the A rank to the first electronic control device 10, and that the first signal intensity detector 22 of the ECU 5 transmits the signal intensity information in the B rank to the first electronic control device 10. It is assumed that the second signal intensity detector 14 of the ECU for portable device detects the signal intensity equivalent to the B rank.

Therefore, the determination unit 15 obtains the signal intensity information on the radio signal received from the portable device 3 in each electronic control device 2. When the signal intensity information and the information on the disposition position corresponding to the electronic control device 2, which is stored in the storage 12, are correlated with each other, it is found how much signal intensity of the radio signal is received in which position of the vehicle C. That is, because the signal intensity of the radio signal depends on the distance between the portable device 3 and the electronic control device 2 that receives the radio signal from the portable device 3, the portable device 3 and the electronic control device 2 are significantly close to each other when the radio signal having the significantly strong signal intensity is received, and the portable device 3 and the electronic control device 2 are significantly distant from each other when the radio signal having the significantly weak signal intensity is received.

Therefore, in one or more embodiments of the invention, the determination unit 15 determines that the portable device 3 is located significantly near the ECU 4, that the portable device 3 is located second nearest the ECU 5 and the ECU for portable device, and that the portable device 3 is located farthest away from the ECU 1, the ECU 2, and the ECU 3. The determination unit 15 determines that the position of the portable device 3 is significantly near the right front door, that the position of the portable device 3 is near the right rear door and the central portion of the vehicle body, and that the position of the portable device 3 is farthest away from the left front door, the left rear door, and the rear trunk.

The determination unit 15 may estimate which is the position significantly near the right front door, near the right rear door and the central portion of the vehicle body, and farthest away from the left front door, the left rear door, and the rear trunk. That is, in one or more embodiments of the invention, assuming that the portable device 3 is located outside the vehicle C, the determination unit 15 can estimate that the portable device 3 is located near the right front door and slightly in front of the right front door.

For example, the use of the finer ranking or the signal intensity (RSSI value) can determine how far is the portable device 3 from the center of the vehicle in which orientation (0° to 360°). The position detection system 1 can provide the position detection system that, using the other electronic control device 2, detects the position of the portable device 3 with high accuracy without providing many dedicated antennae.

Figure 2:
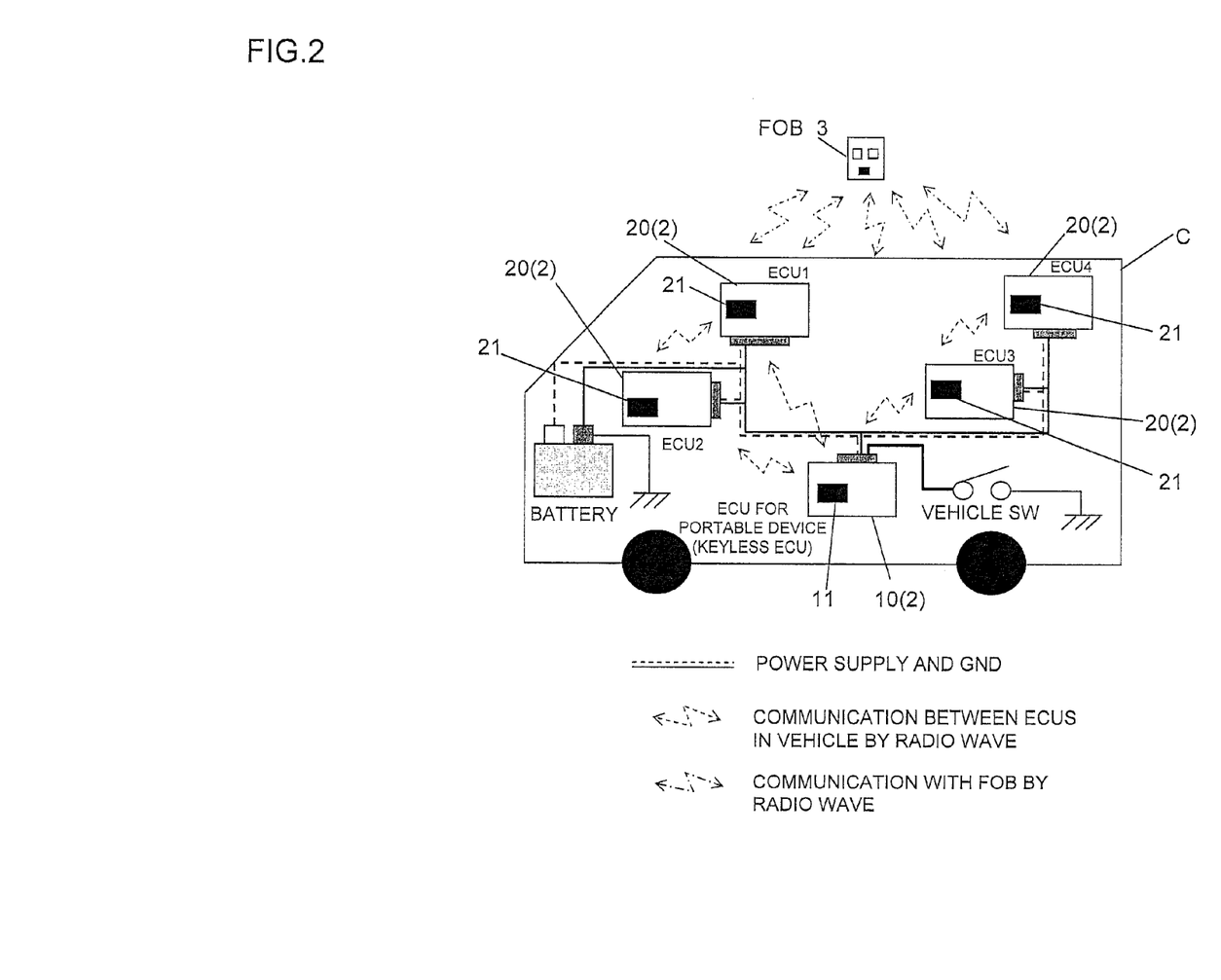
FIG. 2 is a view illustrating the case in which the vehicle control system according to one or more embodiments of the invention is mounted on a vehicle.

FIG. 2 is a view illustrating the case in which the vehicle control system according to one or more embodiments of the invention is actually mounted on the vehicle. Referring to FIG. 2, one first electronic control device 10 (in FIG. 2, ECU for portable device) and four second electronic control devices 20 are provided together with a battery. Each electronic control device is connected to the battery and the power supply line to receive the electric power.

Figure 5:
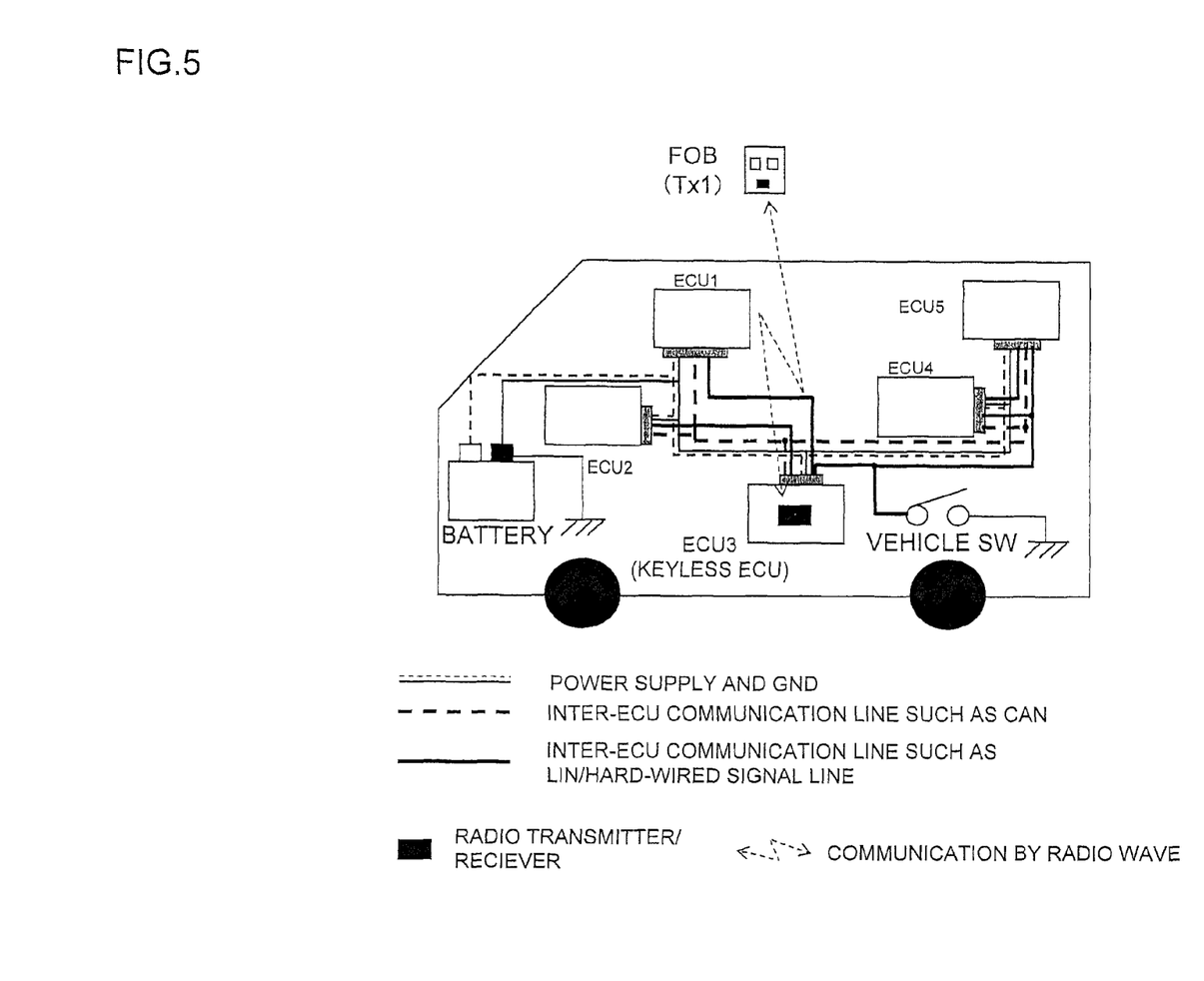
FIG. 5 is a view illustrating the case in which a vehicle control system of the related art is mounted on a vehicle.

The comparison of the vehicle control system according to one or more embodiments of the invention to that of the related art will be described with reference to FIGS. 5, 6, and 7. FIG. 5 is a view illustrating the case in which a vehicle control system of the related art is mounted on the vehicle. Similarly to the vehicle control system in FIG. 2, one electronic control device (in FIG. 5, keyless ECU), corresponding to the first electronic control device 10, which controls the device and four electronic control devices are provided together with the battery. Each electronic control device is connected to the battery and the power supply line to receive the electric power. A wire harness for a CAN (Controller Area Network) in which communication is conducted among ECUs and a wire harness for a LIN (Local Interconnect Network) in which local communication is conducted are disposed.

In the vehicle control system in FIG. 5, the FOB (portable device) conducts communication with only one radio transmitter/receiver included in the keyless ECU. Accordingly, the communication accuracy (reception accuracy) between the FOB and the keyless ECU is degraded when the FOB is located in a position in which the radio signal hardly reaches the keyless ECU of the vehicle. For example, it is necessary to install the antenna in another position in the vehicle to enhance the communication accuracy with the FOB.

Figure 6:
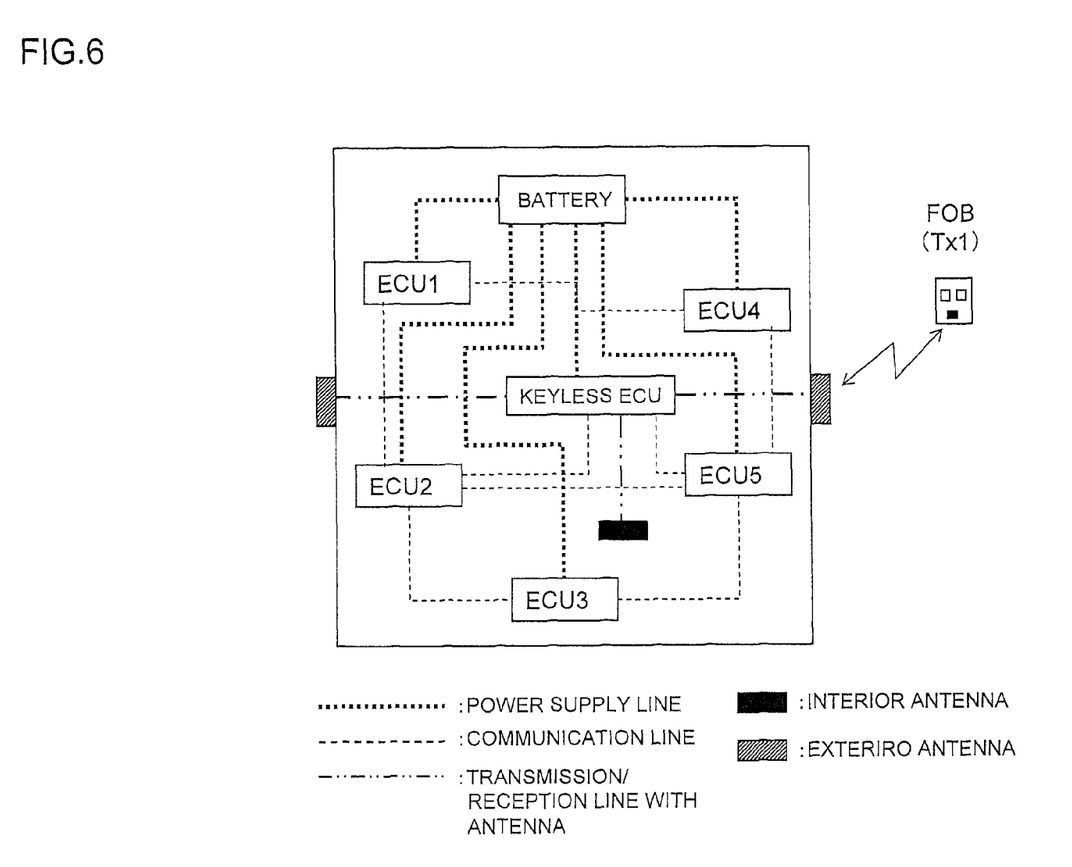
FIG. 6 is a block diagram illustrating a detailed vehicle control system of the related art.

FIG. 6 is a block diagram illustrating the detailed vehicle control system of the related art, and illustrates the case in which the ECUs are connected to each other by the harness. In the vehicle control system in FIG. 6, two exterior antennae are provided in addition to the interior antenna, and the FOB can also conduct communication with the exterior antennae. Therefore, compared with the vehicle control system in FIG. 5, the position of the FOB can be detected according to the received signal intensity in each of the interior/exterior antennae. However, the vehicle is filled with ECUs, and a combination and shearing of the information are required between the ECUs. Therefore, it is necessary to install a communication line between ECUs, which results in enlargement of a wiring space and an increase of a wire harness weight.

Figure 7:
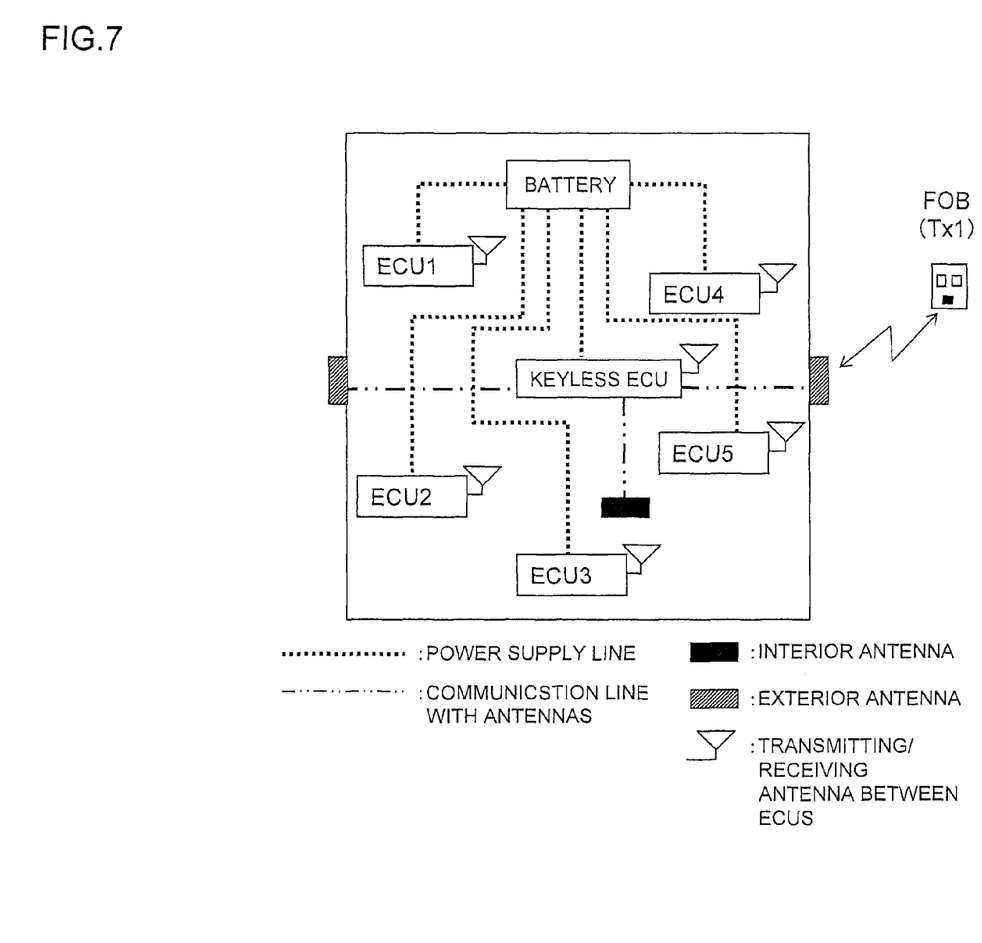
FIG. 7 is a block diagram illustrating the other detailed vehicle control system of the related art.

FIG. 7 is a block diagram illustrating the detailed vehicle control system of the related art, and illustrates the case in which the ECUs conduct radio communication with each other. In the vehicle control system in FIG. 7, in addition to the interior/exterior antennae, each ECU includes an antenna for inter-ECU transmission/reception. Therefore, the communication line connecting the ECUs is eliminated compared with the vehicle control system in FIG. 6. However, because the FOB conducts communication with the interior antenna and the exterior antenna, which are connected through the transmission/reception line, accuracy of detecting the position of the FOB is not enhanced too mach. In order to enhance the accuracy, it is necessary to additionally provide the interior/exterior antenna connected to the keyless ECU. However, the cost increases, and the amount of communication line increases, which results in the enlargement of the wiring space and the increase of the wire harness weight.

Thus, in the related art, it is necessary to additionally provide many antennae in order to detect the position of the FOB with high accuracy, and therefore it is necessary to provide many wire harnesses. On the other hand, as illustrated in FIG. 2, in one or more embodiments of the invention, the FOB conducts communication with the ECUs (second electronic control devices 20) that are disposed throughout the vehicle in addition to the ECU for portable device (first electronic control device 10). Each ECU can conduct communication with the FOB to obtain the signal intensity information from the FOB, and aggregates the signal intensity information in the ECU for portable device through the inter-ECU communication. The ECU for portable device determines the position of the FOB based on the aggregated signal intensity information.

FIG. 3 is a block diagram illustrating the detailed vehicle control system according to one or more embodiments of the invention. The keyless ECU determines the position of the FOB based on many pieces of signal intensity information obtained from the ECUs disposed throughout the vehicle. More specifically, the radio signal transmitted from the FOB is received by the first transmitting/receiving units 21 of the ECU 1 to ECU 5 (20) and the second transmitting/receiving unit 11 of the keyless ECU 10. Each ECU acquires the signal intensity information from the received radio signal. The ECU 1 to ECU 5 (20) transmit the signal intensity information to the keyless ECU (10), and all the pieces of signal intensity information are aggregated in the keyless ECU. The keyless ECU determines the position of the FOB based on the aggregated intensity information.

For example, the detected positional information on the FOB can be used in keyless entry, passive entry, and engine start. For example, in the keyless entry or the passive entry, only the vehicle door nearest the FOB can be unlocked based on the positional information on the FOB. Whether the FOB is located inside or outside the vehicle is determined based on the positional information on the FOB, and the determined information is used in the engine start without a mechanical key or the prevention of leaving of the FOB in the vehicle. Even if the engine start is remotely operated, the engine start can be prevented at a predetermined distance or more based on the positional information on the FOB.

Therefore, the position of the FOB can accurately be detected without providing many dedicated antennae that receive the radio signal from the FOB. In the keyless ECU, compared with the related art, the radio signal depends hardly on the position of the FOB using the ECUs disposed throughout the vehicle. Because the wire harness is hardly required, there is a margin in wiring of the vehicle C, a degree of freedom can be increased in designing and manufacturing the vehicle, and weight reduction of the vehicle is achieved.

Figure 4:
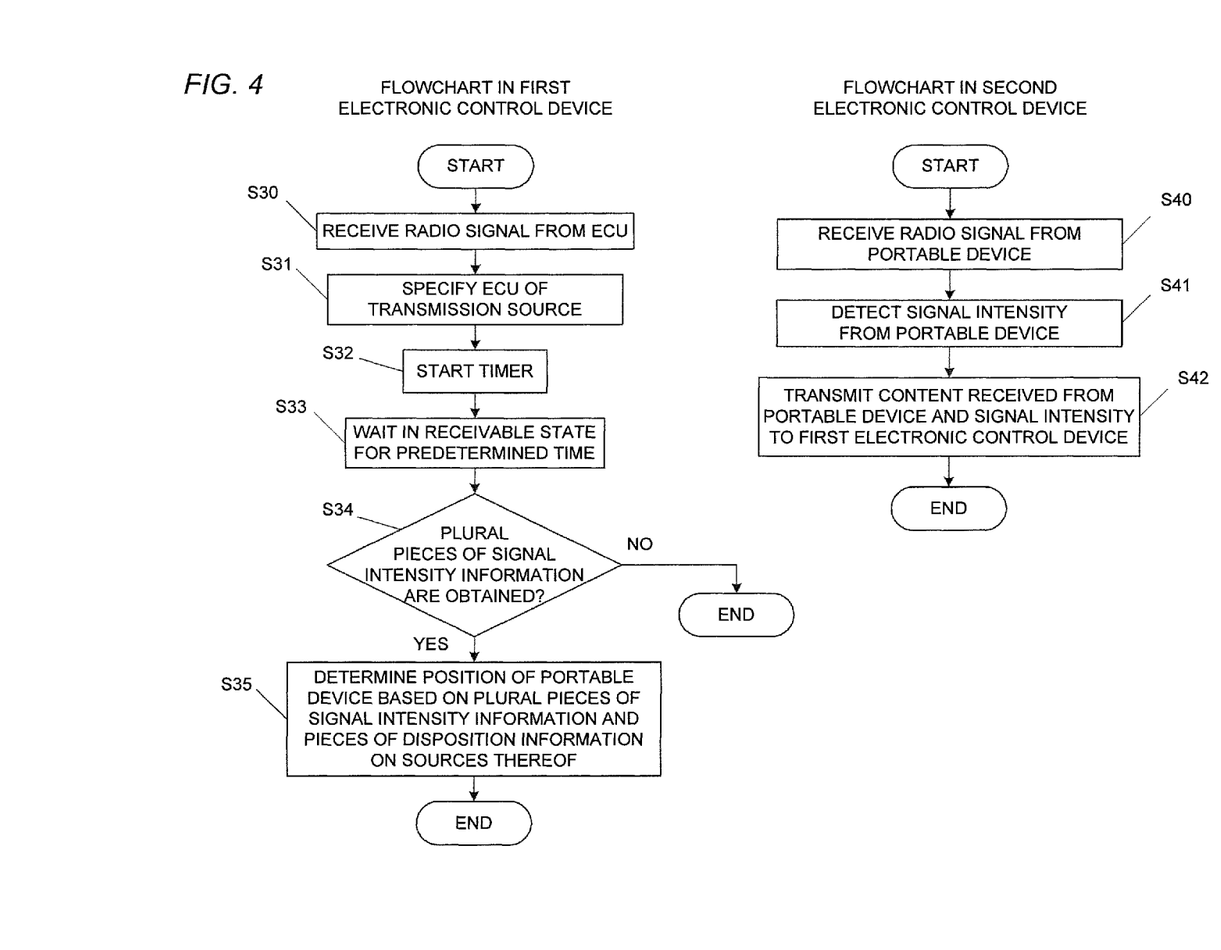
FIG. 4 is a flowchart in the control system according to one or more embodiments of the invention.

FIG. 4 is a flowchart in the vehicle control system according to one or more embodiments of the invention. Step is abbreviated to S. In S40, the second electronic control device receives the radio signal from the portable device. In S41, the second electronic control device extracts the signal intensity of the received radio signal. In S42, the second electronic control device transmits a content (for example, control information on door lock/unlock) included in the received radio signal and the detected signal intensity to the first electronic control device.

In S30, the first electronic control device receives the radio signal from the other ECU (second electronic control device). In S31, the first electronic control device specifies which ECU transmits the received radio signal. In S32, the first electronic control device sets a timer to a predetermined time to start the timer. In S33, the first electronic control device waits in a receivable state for the predetermined time. In S34, the first electronic control device checks whether the pieces of signal intensity information are obtained from the plurality of ECUs during the waiting state. When the pieces of signal intensity information are not obtained, the flow is ended without determining the position of the portable device. When the pieces of signal intensity information are obtained, the first electronic control device determines the position of the portable device based on the pieces of signal intensity information and the pieces of disposition information on the source ECUs in the vehicle in S35.

In the vehicle including the plurality of electronic control devices that conduct communication with each other, Steps in FIG. 4 are a method for determining the position of the radio wave transmitting body that transmits the information controlling the device of the vehicle to the electronic control devices using the radio signal. That is, each first electronic control device in the plurality of electronic control devices detects the signal intensity of the radio signal transmitted from the portable device, and transmits the signal intensity information to each second electronic control device in the plurality of electronic control devices. The second electronic control device determines the position of the portable device based on the signal intensity information transmitted from the first electronic control device, and/or the signal intensity information, which is transmitted from the portable device and detected by the second electronic control device, and the disposition information on the disposition position of each electronic control device in the vehicle. Therefore, in the vehicle including the plurality of electronic control devices that conduct communication with each other, the method for determining the position of the radio wave transmitting body with high accuracy using the other electronic control device can be provided.

The invention is not limited to the embodiments, but various changes and modifications can be made without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A radio-wave-transmitting-body position detection system in a vehicle system comprising:
    a plurality of electronic control devices that are included in a vehicle; and
    a radio wave transmitting body that transmits a radio signal to the plurality of electronic control devices, the electronic control devices conducting communication with each other using the radio signal,
    wherein each electronic control device includes a first electronic control device that conducts communication with the other electronic control device and the radio wave transmitting body using the radio signal, and controls a device included in the vehicle based on a content of the radio signal transmitted from the radio wave transmitting body,
    wherein the electronic control devices except the first electronic control device include:
        a first transmitting/receiving unit that transmits and receives the radio signal;
        a first signal intensity detector that detects signal intensity of the radio signal, which is transmitted from the radio wave transmitting body and received by the first transmitting/receiving unit; and
        an information transmitting unit that transmits information on the signal intensity, which is detected by the first signal intensity detector, from the first transmitting/receiving unit to the first electronic control device, and
    wherein the first electronic control device includes:
        a storage in which disposition information on a disposition position of each electronic control devices in the vehicle is stored;
        a second transmitting/receiving unit that transmits and receives the radio signal;
        a specifying unit that determines whether the radio signal received by the second transmitting/receiving unit is the radio signal transmitted from the radio wave transmitting body or the radio signal transmitted from the other electronic control device, acquires the signal intensity information to specify the electronic control device, which transmits the signal intensity information, when the radio signal received by the second transmitting/receiving unit is the radio signal transmitted from the other electronic control device while the signal intensity information transmitted from the information transmitting unit is included in the radio signal;
        a second signal intensity detector that detects the signal intensity of the radio signal transmitted from the radio wave transmitting body when the specifying unit determines that the radio signal received by the second transmitting/receiving unit is the radio signal transmitted from the radio wave transmitting body; and
        a determination unit that determines a position of the radio wave transmitting body based on the signal intensity information detected by the second signal intensity detector, the signal intensity information acquired by the specifying unit, and the disposition information, which corresponds to the specified first electronic control device and stored in the storage.

* * * * *